April 29, 1930.  E. A. ROBERTSON  1,756,834
AUXILIARY VALVE CLOSING MEANS
Filed Sept. 10, 1927
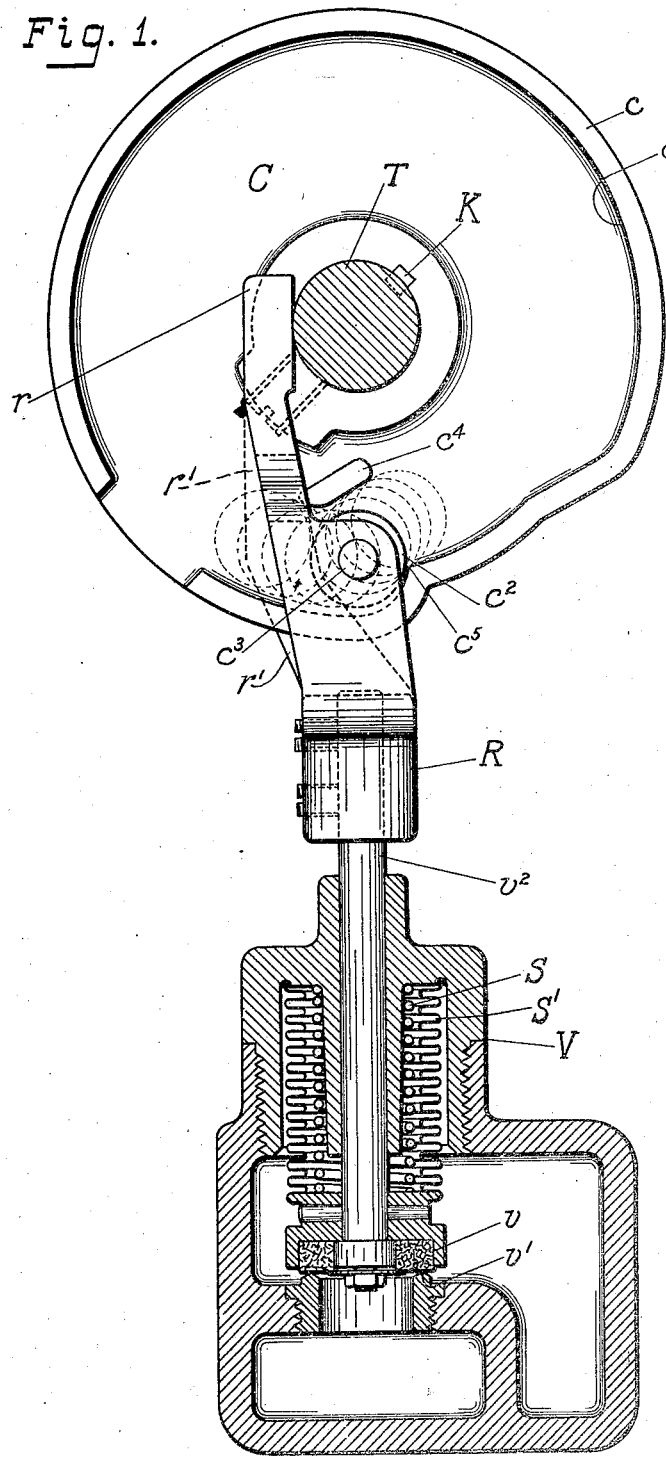
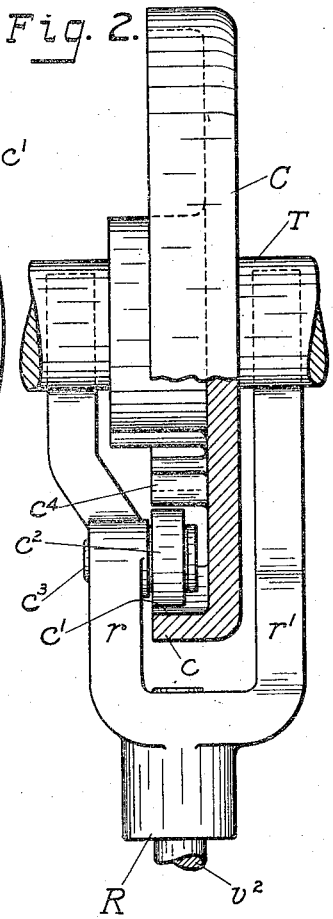
INVENTOR
Edwin A. Robertson
BY Walter A. Knight
ATTORNEY Patented Apr. 29, 1930

1,756,834

UNITED STATES PATENT OFFICE

EDWIN A. ROBERTSON, OF LAKE WAWASEE, INDIANA, ASSIGNOR, BY MESNE ASSIGNMENTS, TO THE WAYNE HOME EQUIPMENT COMPANY, OF FORT WAYNE, INDIANA, A CORPORATION OF MARYLAND

AUXILIARY VALVE-CLOSING MEANS

Application filed September 10, 1927. Serial No. 218,783.

My invention relates to valves closed by a spring or other non-positive means and opened by a cam and particularly to auxiliary valve closing means.

Valves adapted to be closed by springs or other non-positive means sometimes stick and do not start to close promptly or at all, or after starting to close fail to seat because of sticking caused by corrosion, or lessening of the pressure of the valve closing spring.

The object of this invention is to provide positive means for closing such valves. When the primary valve closing means fails to function properly, the positive action of the auxiliary means provided nevertheless forces the valve toward its seat, insuring positive operation at all times.

In the particular embodiment of my invention selected for illustration:

Figure 1 is a plan view of a valve actuating cam mechanism, the valve being shown in axial section, the valve rod being shown in full lines; and Fig. 2 is a side view of the valve rod fork, and an edgewise view of the cam with part of said cam broken away and in section to show the cam roller and the valve seating lug.

Referring now to the drawing, the valve body V has a valve $v$ and seat $v^1$, the valve being normally seated by the tension of resilient members S, $S^1$. The valve rod $v^2$ extends thru and is guided by the body V and its upper end is secured to the valve rod fork R. A cam C having a peripheral flange $c$ and cam track $c^1$ on the inner face of said flange is keyed to the cam shaft T by key K and is so placed as to rotate between the guiding prongs $r$, $r^1$ of the fork of the connecting rod R holding the valve rod and cam roller $c^2$ in alignment. The shaft T and cam C rotate in a counter-clockwise direction only. The cam roller is pivoted on a stud $c^3$ in the prong $r$. A lug $c^4$ on the inner face of the cam C, is so shaped and positioned as to act as a wedge against which the roller $c^2$ is adapted to bear, pressing the valve $v$ positively toward a seating position immediately after the cam roller passes off the point $c^5$ permitting the resilient members S, $S^1$ to function to close the valve.

The lug $c^4$ may be of any desirable length and placed at any desirable position on the inside face of the cam to produce the particular result desired.

I do not wish to be limited to the precise form shown but consider as within the scope of my invention all devices readable on the claims.

I claim as my invention and desire to secure by Letters Patent of the United States:—

1. In combination with a valve, non-positive means for closing said valve and a cam and cam roller for opening said valve; means on said cam against which said roller is adapted to bear in certain positions of the cam pressing said valve toward closing position.

2. In combination with a valve, non-positive means for closing said valve and a cam and cam roller for opening said valve; a wedging lug on said cam against which said roller is adapted to bear in certain positions of the cam pressing said valve toward closing position.

3. A valve closing device having in combination with a spring closed valve and valve rod; a peripherally flanged cam secured to a shaft, the flange on said cam forming a cam track, a cam roller and a stud carried by said rod on which said roller is pivoted, guiding means secured to the valve rod and adapted to contact with the cam shaft and wedging means on said cam against which the cam roller is adapted to bear in certain positions of the cam positively pressing said valve toward closing position.

In testimony whereof I have hereunto set my hand.

EDWIN A. ROBERTSON.